(12) United States Patent
Lin et al.

(10) Patent No.: US 7,580,330 B2
(45) Date of Patent: Aug. 25, 2009

(54) CE TO RRO CANCELLATION FOR SLED CONTROL

(75) Inventors: Xiao Lin, San Jose, CA (US); Louis J. Serrano, Los Gatos, CA (US)

(73) Assignee: LSI Corporation, Milpitas, CA (US)

( * ) Notice: Subject to any disclaimer, the term of this patent is extended or adjusted under 35 U.S.C. 154(b) by 696 days.

(21) Appl. No.: 11/259,300

(22) Filed: Oct. 26, 2005

(65) Prior Publication Data
US 2007/0091742 A1    Apr. 26, 2007

(51) Int. Cl.
*G11B 7/00* (2006.01)
(52) U.S. Cl. .................. 369/44.28; 369/44.29
(58) Field of Classification Search ........ None
See application file for complete search history.

(56) References Cited

U.S. PATENT DOCUMENTS

| | | | | | |
|---|---|---|---|---|---|
| 5,499,105 | A | * | 3/1996 | Wakui | 386/125 |
| 7,136,329 | B2 | * | 11/2006 | Yoon et al. | 369/30.11 |
| 2001/0002893 | A1 | * | 6/2001 | Ohshita et al. | 369/44.28 |
| 2003/0151987 | A1 | * | 8/2003 | Watanabe et al. | 369/44.26 |

\* cited by examiner

*Primary Examiner*—Joseph Feild
*Assistant Examiner*—Joseph Haley
(74) *Attorney, Agent, or Firm*—Christopher P. Maiorana, PC

(57) ABSTRACT

An apparatus comprising a center error creation circuit, a center error controller, and a center error repeatable run out circuit. The center error creation circuit may be configured to generate a center error signal in response to photo-diode signals. The center error controller may be configured to adjust a lens to a center position in a sled housing with a step motor in response to a center error measure signal. The center error repeatable run out circuit may be configured to generate a center error run out signal and the center error measure signal in response to the center error signal. The center error repeatable run out circuit may generate the center error measure signal by measuring the center error signal when the center error run out signal is in a peak phase.

20 Claims, 11 Drawing Sheets

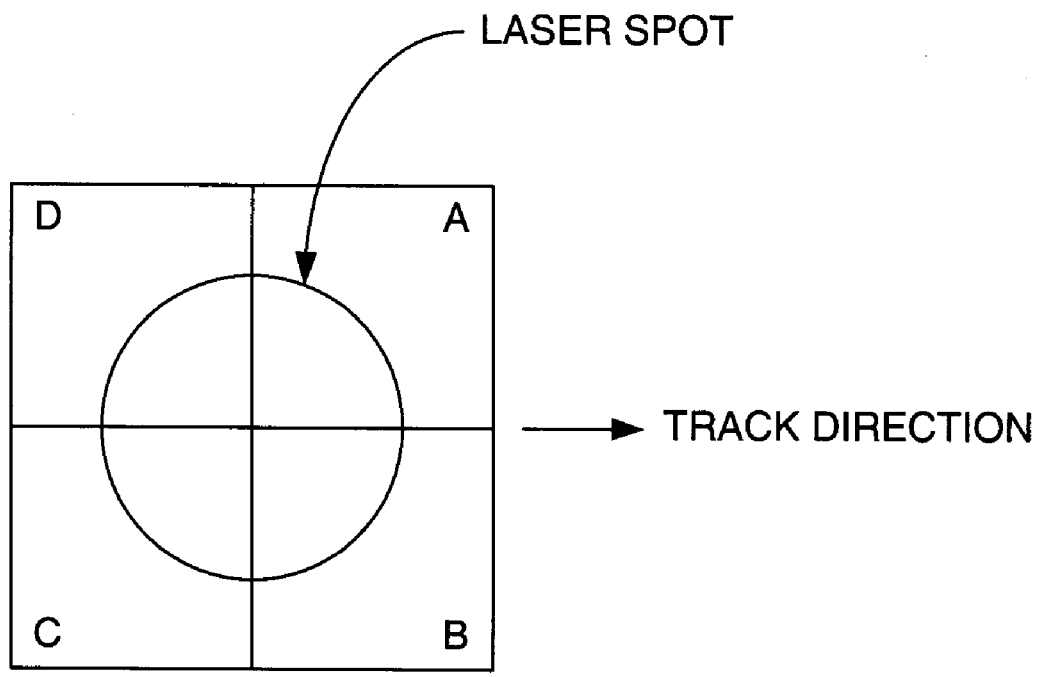
FIG. 1
(CONVENTIONAL)

CE TO RRO CANCELLATION FOR SLED CONTROL

FIELD OF THE INVENTION

The present invention relates to optical storage generally and, more particularly, to a method and/or apparatus for implementing CE to RRO cancellation for sled control.

BACKGROUND OF THE INVENTION

In a conventional optical disc system, to sense the position of the laser beam in relation to the track on the disc, the main laser beam creates a reflection from the disc. The reflection is typically picked up by 4 photo-diode sensors (or a photo detector array). FIG. 1 is a conceptual diagram illustrating how such a photo-diode configuration is laid out in relation to the track direction. The outputs of the 4 photo-diodes (when the laser beam is focused on the disc) are shown as signals A, B, C and D, respectively.

The tracks on an optical disc (or disc) form a long spiral. As the disc spins, a laser follows the spiral from the inner diameter (ID) to the outer diameter (OD) of the disc. However, for discs with run out, the center of the spiral is not the center of rotation of the spiral. As the disc rotates, the tracks move radially relative to a fixed point (e.g., laser spot). To reduce such an effect of additional errors created by placing the laser spot on the tracks, a closed loop control system is used. While the closed loop control is operating, the lens moves radially with the disc so that the laser spot is held on the center of the track. The radial motion between the lens and the disc is defined as the run out.

The track position (i.e., the location of the laser spot relative to a center of the track) is detected by imaging the laser on a photo detector array. Diffraction causes a slight change in intensity on the two different sides of the photo detector array when the relative position of the laser spot and the track center changes. The difference in intensity on the two different sides of the photo detector array is called a push-pull signal. The push-pull signal is proportional to the tracking error signal.

If the laser does not shine directly through the center of the lens, an image is moved to one side and the image shows up in the push-pull signal change. Such an effect is defined as the center error. The center error cannot be distinguished from the push-pull effect by examining one laser spot alone. To obtain an accurate track position, a second measurement is taken on one-half track away from where the first measurement was taken. With the second measurement, the center error is common to the first measurement, but the push-pull effect is reversed. By combining the first and the second measurements, an accurate track position can be determined. For DVD ROMs, a phase detection method is used to detect the track position. The phase detection method is mostly immune to the effect of center error.

Referring to FIG. 2, a typical center error waveform in the presence of a disc run out during tracking mode is shown. Run out is proportional to center error. As the disc moves radially, with a period of one spindle revolution, the laser follows the center of the tracks. The radial motion of the lens induces a center error that is synchronous to the rotation of the disc.

SUMMARY OF THE INVENTION

The present invention concerns an apparatus comprising a center error creation circuit, a center error controller, and a center error repeatable run out circuit. The center error creation circuit may be configured to generate a center error signal in response to photo-diode signals. The center error controller may be configured to adjust a lens to a center position in a sled housing with a step motor in response to a center error measure signal. The center error repeatable run out circuit may be configured to generate a center error run out signal and the center error measure signal in response to the center error signal. The center error repeatable run out circuit may generate the center error measure signal by measuring the center error signal when the center error run out signal is in a peak phase.

The objects, features and advantages of the present invention include providing a method and/or apparatus for a CERRO cancellation for better sled control that may (i) track a center error with a higher bandwidth (ii) improve centering a lens during a track mode and/or (iii) provide for a faster center error recovery after a rough seek.

BRIEF DESCRIPTION OF THE DRAWINGS

These and other objects, features and advantages of the present invention will be apparent from the following detailed description and the appended claims and drawings in which:

FIG. 1 is a diagram illustrating a photo-diode sensor distribution system;

DETAILED DESCRIPTION OF THE PREFERRED EMBODIMENTS

Figure 2:
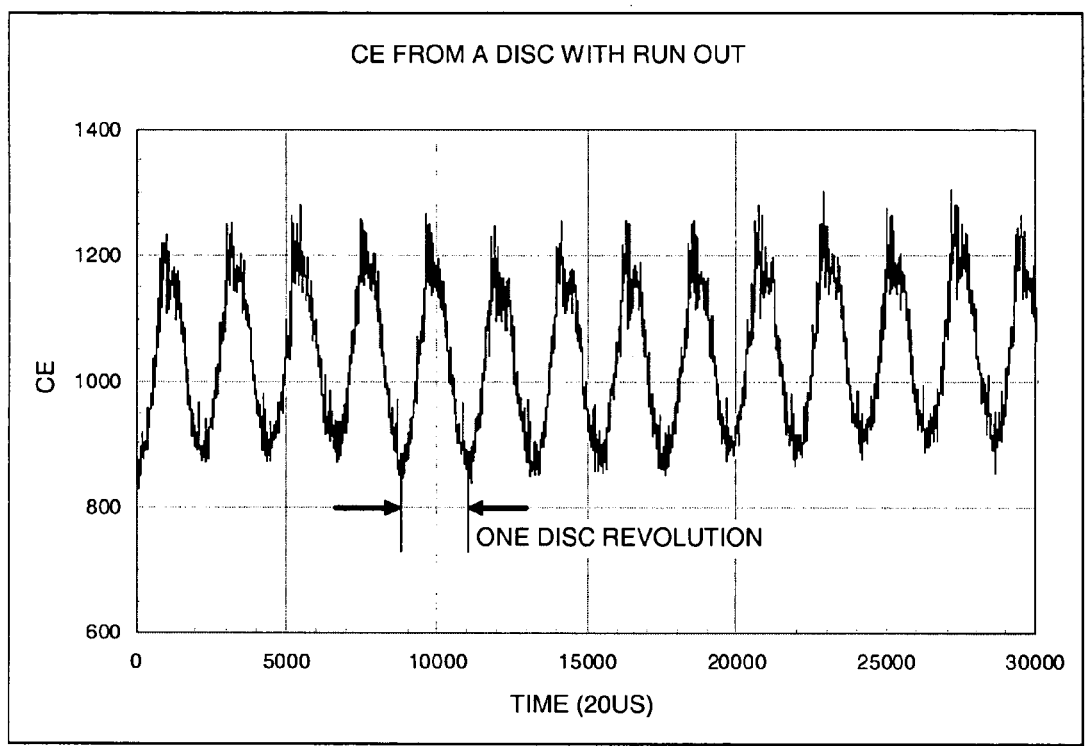
FIG. 2 is a diagram illustrating a typical CE waveform in the presence of a disc run out.
Figure 3:
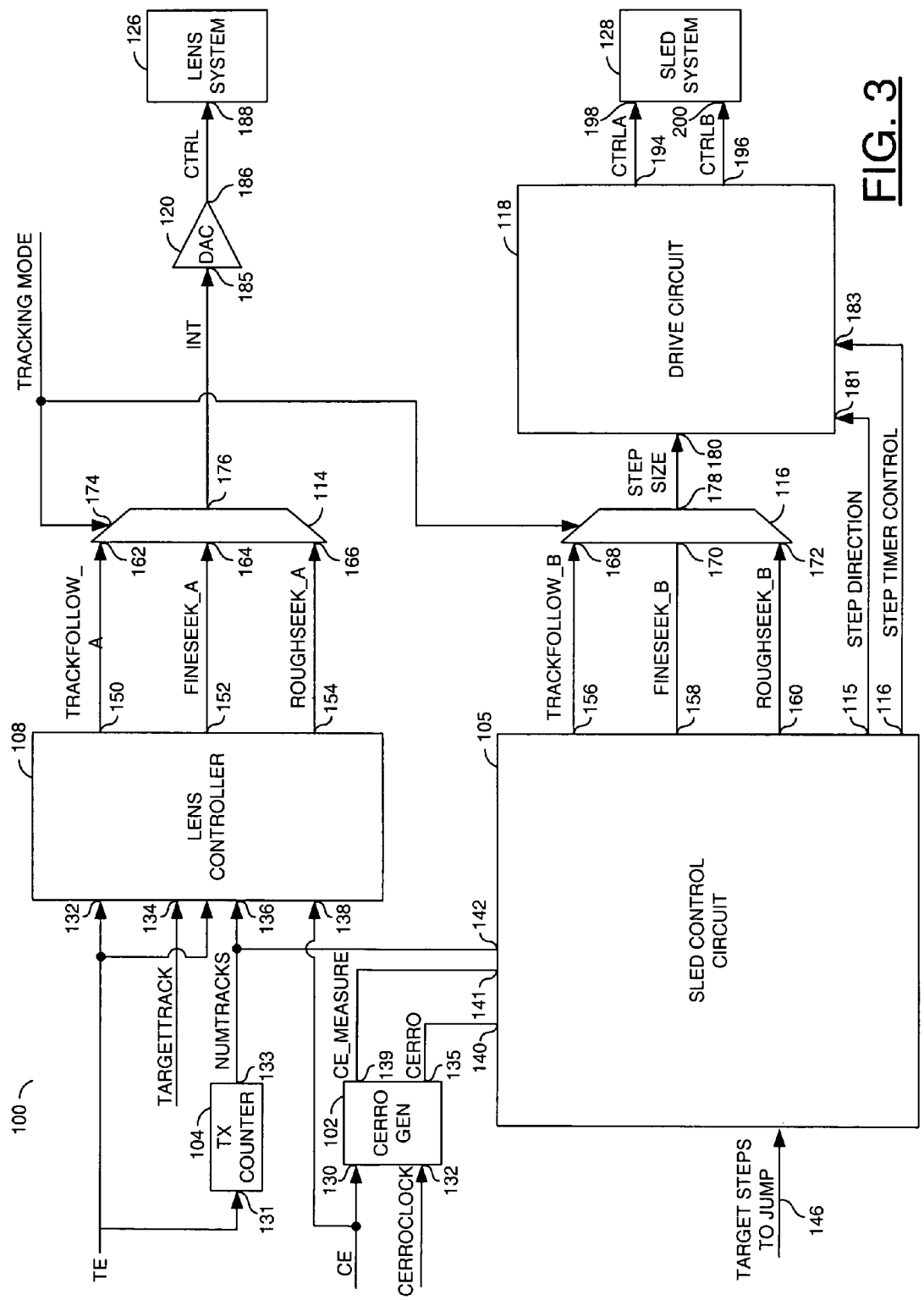
FIG. 3 is a block diagram in accordance with the present invention.

Referring to FIG. 3 a diagram of a system 100 in accordance with the present invention is shown. The system 100 generally comprises a block (or circuit) 102, a block (or circuit) 104, a block (or circuit) 105, a block (or circuit) 108, a block (or circuit) 114, a block (or circuit) 116, a block (or circuit) 118, a block (or circuit) 120, a block (or circuit) 126 and a block (or circuit) 128. The circuit 102,may be implemented as a CE repeatable run out (RRO) generation circuit. The circuit 104 may be implemented as a track counter. The circuit 105 may be implemented as a sled control circuit. The circuit 108 may be implemented as a lens controller. The circuit 114 may be implemented as a multiplexer. The circuit 116 may be implemented as a multiplexer. The circuit 118 may be implemented as a drive circuit. The circuit 120 may be implemented as a digital to analog converter circuit. The circuit 126 may be implemented as a lens system. The circuit 128 may be implemented as a step sled system 128.

The CERRO generation circuit 102 may have an input 130 that may receive the signal CE and an input 132 that may receive a clock signal (e.g., CERROCLOCK). The CERRO generation circuit 102 may have an output 135 that may present a signal (e.g., CERRO) and an output 139 that may present a signal (e.g., CE_MEASURE). The track counter 104 may have an input 131 that may receive the signal TE and an output 133 that may present a signal (e.g., NUMTRACKS). The sled control circuit 105 may have an input 140 that may receive the signal CERRO, an input 141 that may receive the signal CE_MEASURE, an input 142 that may receive the signal (e.g., NUMTRACKS), and an input 146 that my receive a signal (e.g., TARGETSTEPSTO-JUMP). The lens controller 108 may have an input 132 that may receive the signal TE, an input 134 that may receive a signal (e.g., TARGETTRACK), an input 136 that may receive the signal NUMTRACKS, and an input 138 that may receive the signal CE. The lens controller 108 may have an output 150 that may present a signal (e.g., TRACKFOLLOW_A), an output 152 that may present a signal (e.g., FINESEEK_A) and an output 154 that may present a signal (e.g., ROUGH-SEEK_A).

The sled control circuit 105 may have an output 115 that may present a signal (e.g., STEPDIRECTION), an output 116 that may present a signal (e.g., STEPTIMERCONTROL), an output 156 that may present a signal (e.g., TRACKFOL-LOW_B), an output 158 that may present a signal (e.g., FINESEEK_B), and an output 160 that may present a signal (e.g., ROUGHSEEK_B). The multiplexer 114 may have an input 162 that may receive the signal TRACKFOLLOW_A, an input 164 that may receive the signal FINESEEK_A, an input 166 that may receive the signal ROUGHSEEK_A and an input 174 that may receive a signal (e.g., TRACKING-MODE). The multiplexer 114 may have an output 176 that may present any one of the signals TRACKFOLLOW_A, FINESEEK_A or ROUGHSEEK_A on a signal (e.g. INT). The signals TRACKFOLLOW_A, FINESEEK_A or ROUGHSEEK_A may represent a tracking lens control signal.

The multiplexer 116 may have an input 168 that may receive the signal TRACKFOLLOW_B, an input 170 that may receive the signal FINESEEK_B, and an input 172 that may receive the signal ROUGHSEEK_B. The multiplexer 116 may have an output 178 that may present signal (e.g., STEPSIZE). The signals TRACKFOLLOW_B, FINE-SEEK_B, or ROUGHSEEK_B may be represented by the signal STEPSIZE. The drive circuit 118 may have an input 180 that may receive the signal STEPSIZE, an input 181 that may receive a signal (e.g., STEPDIRECTION), and an input 183 that may receive a signal (e.g., STEPTIMERCON-TROL). The drive circuit 118 may have an output 194 that may present a signal (e.g., CTRLA) and an output 196 that may present a signal (e.g., CTRLB). The lens controller 108 may control a lens (not shown) in the lens system 126 based on the mode of the system 100. The lens controller 108 may control the lens in response to the signal TE or the signal CE based on the mode of the system 100. The drive circuit 118 may control a step motor (not shown) in the sled system 128 in response to the signals STEPTIMERCONTROL, STEP-DIRECTION or STEPSIZE based on the mode of the system 100. The digital-to-analog converter 120 may have an input 185 that may receive the signal INT and an output 186 that may present a signal (e.g., CTRL). The lens system 126 may have an input 188 that receives a signal (e.g., CTRL).

Figure 4:
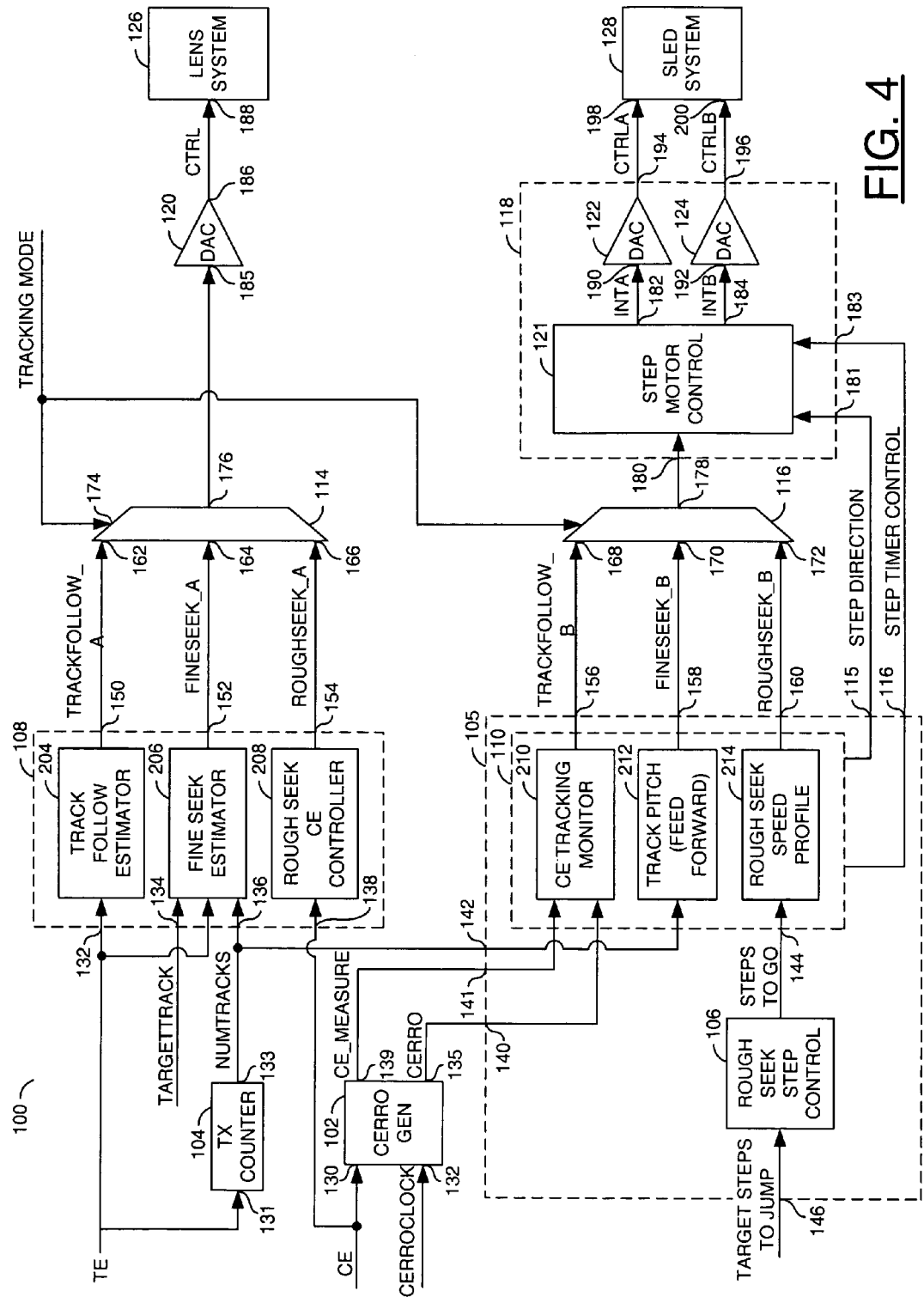
FIG. 4 is a more detailed block diagram in accordance with the present invention.

Referring to FIG. 4, a more detailed diagram of the system 100 is shown. The lens controller 108 generally comprises a block (or circuit) 204, a block (or circuit) 206, and a block (or circuit) 208. The circuit 204 may be implemented as a track follow estimator circuit. The circuit 206 may be implemented as a fine seek estimator circuit. The circuit 208 may be implemented as a rough seek controller circuit. The lens controller 108 may control the lens system 126 based on whether the system 100 is in the track follow mode, the fine seek mode, or the rough seek mode. The track follow estimator 204 and the fine seek estimator 206 may be implemented as a track controller.

The sled control circuit 105 generally comprises a block (or circuit) 106 and a block (or circuit) 110. The circuit 106 may be implemented as a rough seek step control circuit. The circuit 110 may be implemented as a sled controller. The sled controller 110 generally comprises a block (or circuit) 210, a block (or circuit) 212 and a block (or circuit) 214. The circuit 210 may be implemented as a CE tracking monitor. The rough seek controller 208 and the CE tracking monitor 210 may be implemented as a center error controller. The rough seek CE controller 208 may control the lens when the system 100 is in the rough seek mode. The center error controller (or CE tracking monitor 210) may position a sled housing (not shown) when the system 100 is in the track-follow mode. The circuit 212 may be implemented as a feed forward circuit for fine seek mode. The circuit 214 may be implemented as a rough seek speed profile circuit. The drive circuit 118 generally comprises a block (or circuit). 121, a block (or circuit) 122, and a block (or circuit) 124. The circuit 121 may be implemented as a step motor control circuit. The circuit 120 may be implemented as a digital-to-analog converter. The circuit 122 may be implemented as a digital-to-analog converter. The circuit 124 may be implemented as a digital to analog converter. The sled controller 110 may have an input 144 that may receive a signal (e.g., STEPSTOGO). The step motor control circuit 121 may have an output 182 that may present a signal (e.g., INTA) and an output 184 that may present a signal (e.g., INTB).

The digital-to-analog converter 122 may have an input 190 that may receive the signal INTA and an output 194 that may present a signal (e.g., CTRLA). The digital-to-analog converter 124 may have an input 192 that may receive the signal INTB and an output 196 that may present a signal (e.g., CTRLB). The step sled system 128 may have an input 198 that may receive the signal CTRLA and an input 200 that may receive the signal CTRLB. The sled controller 110 may control the step motor control circuit 121 based on whether the system 100 is in the track follow mode (or tracking mode), the fine seek mode or the rough seek mode. The step motor control circuit 121 may drive a step motor (not shown) in the step sled system 128. The step motor may drive a sled housing (not shown) in the step sled system 128.

The signal STEPDIRECTION may provide the direction of travel for the step motor. The signal STEPTIMERCON-TROL may provide the time and/or frequency between two adjacent step motor steppings. The signal TARGETSTEP-STOJUMP may provide the number of steppings needed for the step direction and step frequency of the step motor. When the system 100 is in the track follow mode, the CE tracking monitor 210 may generate the control signals STEPSIZE, STEPDIRECTION, and STEPTIMERCONTROL in response to the signal CE_MEASURE. When the system 100 is in the fine seek mode, the feed forward control circuit 212 may generate the control signals STEPSIZE, STEPDIREC-TION, and STEPTIMERCONTROL by monitoring the number of tracks crossed on the signal NUMTRACKS. When the system 100 is in the rough seek mode, the speed profile circuit 214 may generate the control signals STEPSIZE, STEPDI- RECTION, and STEPTIMERCONTROL based on the number of tracks left to go on the signal STEPSTOGO.

The track follow estimator 204 may position the lens on the center of a track when the system 100 is in the track follow mode. The track counter 104 may (i) count the zero crossings of the signal TE and (ii) provide the number of tracks that the lens has crossed on the signal NUMTRACKS. The fine seek estimator 206 may move the lens a predetermined number of tracks under a specified direction when the system 100 is in the fine seek mode. The CERRO generation circuit 102 may remove the once-a-round component from the signal CE due to the presence of run out when the laser spot follows the center of a track. The CERRO generation circuit 102 may adjust the center of the lens with a step motor via the CE tracking monitor 210 and the drive circuit 118 by the signal CE_MEASURE when the signal CERRO is in a peak or bottom phase. The CE controller 208 may position the lens in the sled housing to an optical center (e.g., adjust the signal CE to zero) when the system 100 is in the rough seek mode in response to the signal CE. The signals TRACKFOLLOW_A, FINESEEK_A, AND ROUGHSEEK_A may be digital control signals presented by the multiplexer 114. The digital-to-analog converter 120 may convert any one of the signals TRACKFOLLOW_A, FINESEEK_A, or ROUGHSEEK_A to an analog control signal on the signal CTRL to drive the lens system 126.

The CE tracking monitor 210 may keep the lens at the center of the housing in response to the signal CE_MEASURE when the system 100 is in the track follow mode. The feed forward circuit 212 may calculate the corresponding step motor steps (or steppings) needed to move the step motor to ensure that the lens will stay at the center of the sled housing when the system 100 is in the fine seek mode. The feed forward circuit 212 may use the number of tracks that the lens has crossed to calculate the corresponding step motor steps when the system 100 is in the fine seek mode. The rough seek step control 106 generates a rough seek speed profile on the signal STEPSTOGO when the system 100 is in a rough seek mode. The rough seek speed profile 214 may determine step size, direction and frequency for each individual stepping the step motor needs to perform based on a speed profile. The step motor control circuit 118 may receive the signals STEPSIZE, STEPDIRECTION AND STEPTIMERCONTROL. The mode of the system 100 may be determined by the signal TRACKING_MODE (e.g., whether the system 100 is in the track follow mode, the file seek mode or the rough seek mode). The step motor controller circuit 121 may present digital data on the signals INTA and INTB. The digital-to-analog converter 122 may convert the digital data on the signal INTA to the analog control signal CTRLA. The digital-to-analog converter 124 may convert the digital data on the signal INT_B to the analog control signal CTRLB.

Figure 5:
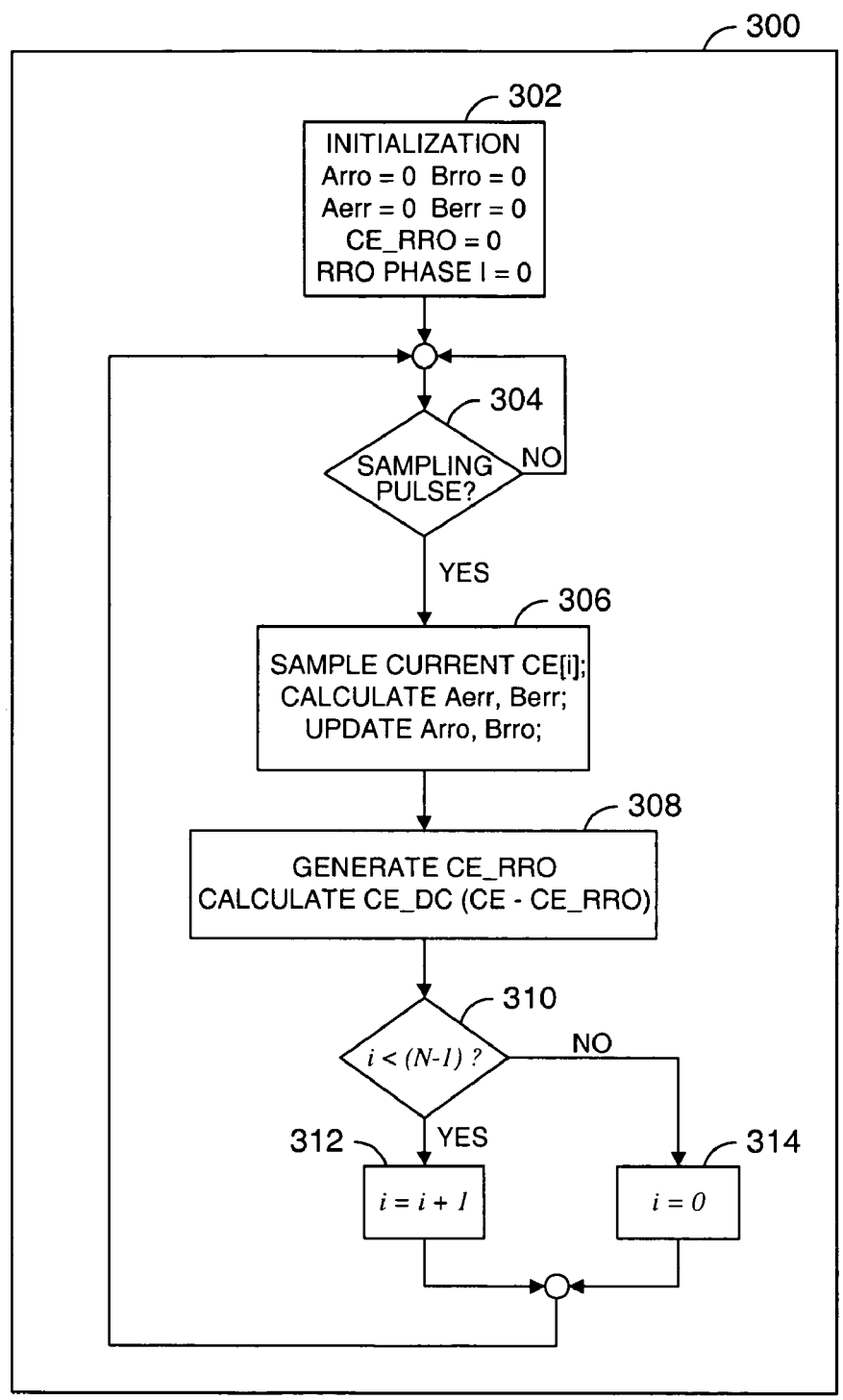
FIG. 5 is a flow diagram illustrating a process in accordance with a preferred embodiment of the present invention for extracting the signal CERRO.

Referring to FIG. 5, a flow diagram illustrating a process 300 in accordance with a preferred embodiment of the present invention for extracting the signal CERRO is shown. The process 300 generally comprises a state (or step) 302, a decision state (or step) 304, a state (or step) 306, a state (or step) 308, a decision state (or step) 310, a state (or step) 312, and a state (or step) 314. The state 302 may (i) initialize CERRO coefficients (e.g., $A_{rro}$ and $B_{rro}$) of the sine and cosine wave of the signal CERRO to zero, (ii) initialize CERRO error coefficients (e.g., $A_{err}$ and $B_{err}$) to zero and (iii) initialize the sine wave and cosine wave generators at an RRO frequency. While the system 100 is in the track follow mode, the repeatable run out of the disc may be observed on the signal CE. The signal CE generally comprises a sinusoid wave which oscillates at the same frequency of rotation of the disc. The sine and cosine waves of the signal CERRO may be generated by a wave generator. The wave generator may be reinitialized each cycle, and produce both the sine and cosine wave at the repeatable run out frequency. The process 300 may adapt the coefficients of the sine and cosine wave to ensure that the signal CERRO is equal to the repeatable run out.

The signal CERRO may be generated by using the weighted sum of the sine and cosine wave at the disc once-a-round frequency. The weighted sums of the sine and cosine waveforms may be defined as the CERRO coefficients $A_{rro}$ and $B_{rro}$.

The state 302 may initialize the signal CERRO at a zero magnitude. For each sample on the signal CE, the signal CERRO may be updated using new measurements. The CERRO error coefficients $A_{err}$ and $B_{err}$ may be initialized only once. The state 304 generally determines whether there is a sampling pulse. Each sampling pulse provides the timing and trigger for measuring the signal CE to generate the signal CERRO within one spindle generation. If there is a sampling pulse, the method 300 moves to the state 306. The state 306 may (i) sample the current signal CE at a RRO phase index (e.g., i), (ii) calculate the signal CERRO error coefficients $A_{err}$ and $B_{err}$ and (iii) update the CERRO coefficients $A_{rro}$ and $B_{rro}$. The process 300 may measure the difference between the measured repeatable run out and the signal CERRO. During each measurement time, the measurement may be multiplied by the corresponding sine wave value, and accumulate in a value $A_{err}$. During each measurement time, the measurement may be multiplied by the corresponding cosine wave value, and accumulate to a value $B_{err}$.

The process 300 may multiply the CERRO error coefficients $A_{err}$ and $B_{err}$ by 2/N, where N is the number of measurements in one revolution of the disc. The state 306 may update $A_{rro}$ to $A_{rro}+mA_{err}$, where m is the adaptation gain (or a design parameter). The state 306 may update $B_{rro}$ to $B_{rro}+mB_{err}$. The state 308 may generate the updated signal CERRO which may be equal to $A_{rro}\sin(w_0 t)+B_{rro}\cos(w_0 t)$, where $w_0$ may be defined as a once-a-round frequency. The state 308 may calculate the difference between the signal CE and the updated signal CERRO taken at the last measurement. The error of the signal CERRO may be observed by measuring the difference between the sinusoid wave of the signal CERRO and the signal CE. The signal CERRO may be updated after each measurement. The decision state 310 may update an RRO phase index and repeat state 304.

The design parameter m used in the state 306 may control an adaptation speed. The larger the value of m, the faster the signal CERRO may adapt to the changing repeatable run out. However, the signal CERRO may be susceptible to noise. If the value m is too large, the adaptation speed may actually diverge. If the value m is too small, then the signal CERRO may converge slowly. Mathematical analysis and/or experiment may be used to determine the selection of the value m.

Figure 6:
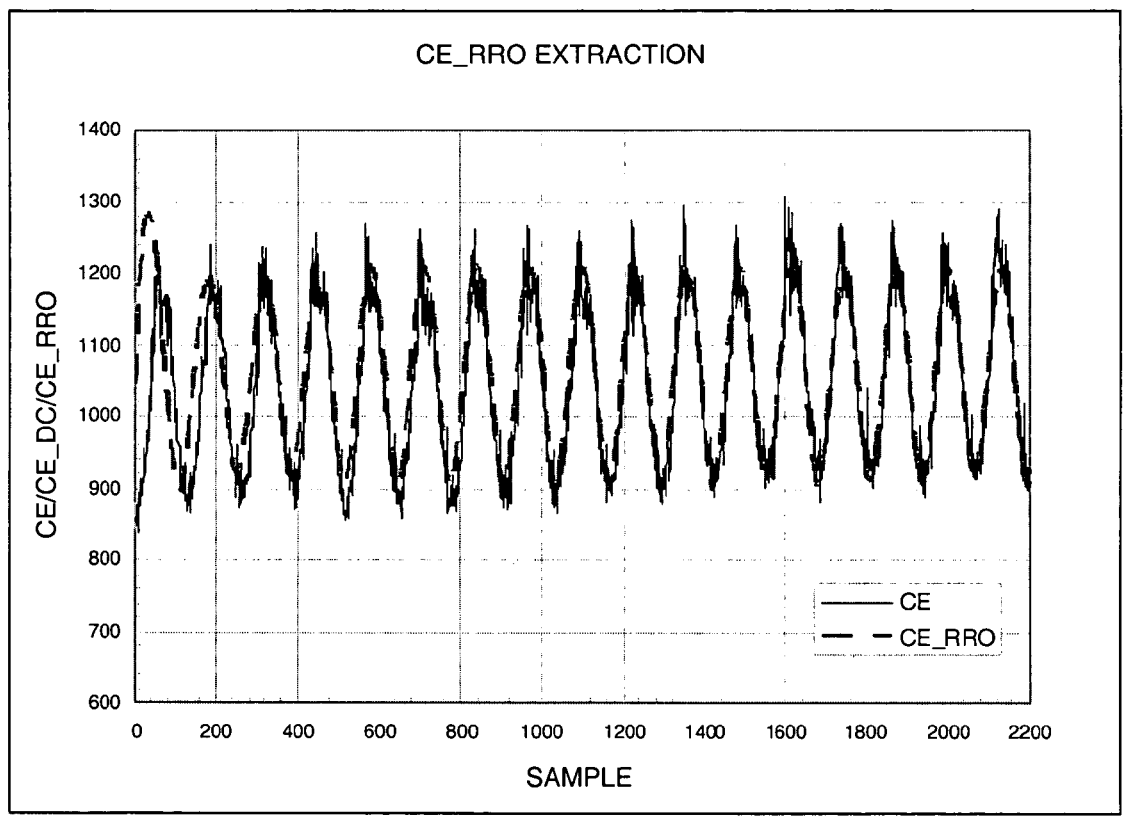
FIG. 6 is a diagram illustrating a CERRO waveform in comparison to a CE waveform.

Referring to FIG. 6, a diagram illustrating a CERRO waveform in comparison to a CE waveform is shown. When the system 100 is in the tracking mode, the laser follows a track of the disc as the track spirals out. The step sled system 128 may need to move toward the outer diameter (OD) direction synchronously to keep the lens centered in a sled housing (not shown) (e.g., the signal CE is zero). Due to the disc/spindle eccentricity, the lens may also follow the run out as the lens gradually moves out. The system 100 may allow the lens to follow the sinusoidal run out of the disc where the average center of the lens monotonically moves toward the OD with the spiral of the track.

Figure 7:
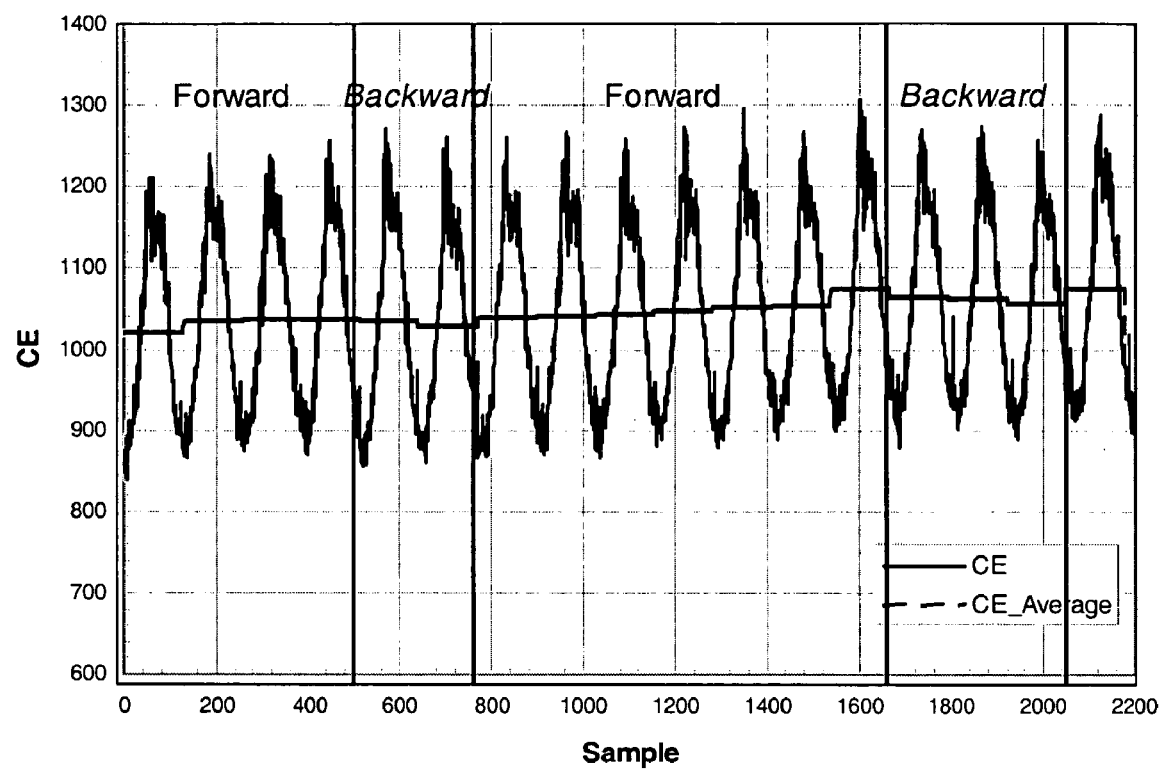
FIG. 7 is a diagram illustrating sled control with a CE average method.

Referring to FIG. 7, a diagram illustrating control of the sled system 128 with a CE average method is shown. Conventional methods use the average value of the signal CE in one revolution of the disc as a control signal to control the direction the step sled system 128. The direction of movement for the step sled system 128 may move as a result of using the averaged signal CE over one disc rotation to determine the relative position of the lens. The relative position of the lens may be with respect to the optical center of the lens. FIG. 7 illustrates that the step sled system 128 may move in both directions while the laser monotonically spirals out (e.g., or in the presence of disc run out), which may be undesired. By lowering the response frequency of the step motor to the signal CE, the sled system 128 may move in one direction. However, the reduction of step motor sensitivity in relation to the signal CE may slow down the recovery of the position of the lens toward the center of the sled housing after the system 100 exits the rough seek mode. By using the extracted signal CERRO, the system 100 may accurately identify the center of the lens with run out present by measuring the signal CE when the signal CERRO is at a maximum magnitude.

Figure 8:
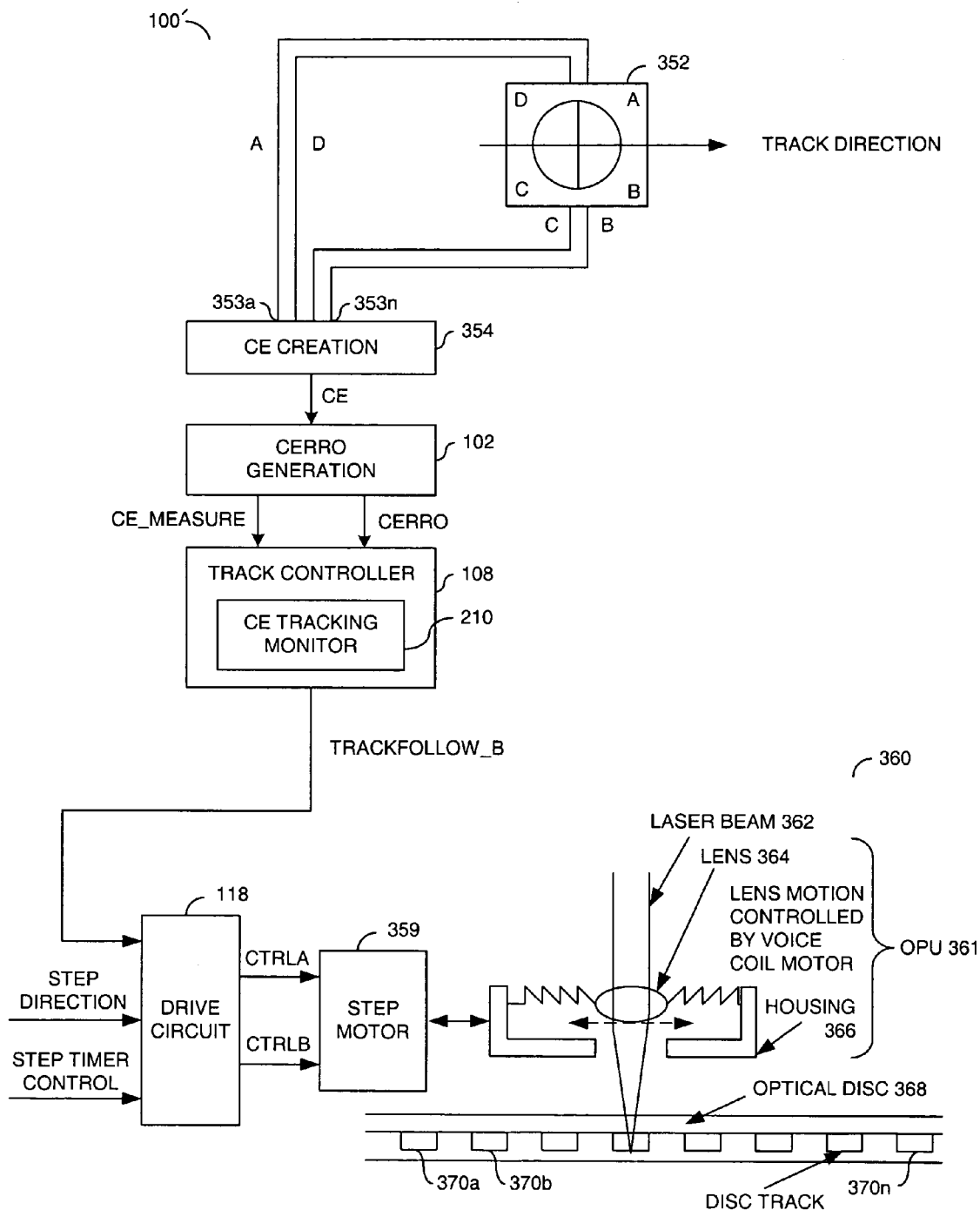
FIG. 8 is a diagram illustrating the present invention in a tracking mode.

Referring to FIG. 8, a detailed diagram of a system 100' in the track follow mode is shown. The system 100' generally comprises the CERRO generation circuit 102, the track controller 108, the drive circuit 118, a photo diode system 352, a CE creation circuit 354, a step motor 359 and a lens housing assembly 360. The lens housing assembly 360 generally comprises a laser beam 362, a lens 364, a sled housing 366, an optical disc 368 and a number tracks 370a-370n.

The photo-diode system 352 generally has output signals (or photo-diode signals) A, B, C and D that are generally presented to a number of inputs 353a-353n. The CE creation circuit 354 may generate the signal CE. The CERRO generation circuit 102 may generate the signal CERRO in response to the signal CE. The CERRO generation circuit 102 may measure the signal CE when the signal CERRO is in a peak or bottom phase. The CERRO generation circuit 102 may generate the signal CE_MEASURE in response to measuring the signal CE when the signal CERRO is in a peak or bottom phase. The CE tracking monitor 210 may generate the signal TRACKFOLLOW_B in response to the signal CE_MEASURE and the signal CERRO. The drive circuit 118 may control the step motor 359 in response to the signals STEPSIZE, STEPDIRECTION, and STEPTIMERCONTROL. The step motor 359 may move the sled housing 366 to center the lens 364 in the presence of run out on the disc 368 based on the value of the signal CE_MEASURE if the signal CERRO is in a peak or bottom phase.

The system 100' generally provides better control (compared with conventional approaches) of the sled housing 366 when the system 100' is in the tracking mode. The CERRO generation circuit 102 may remove the once-a-round component from the signal CE due to the repeatable run out present on the disc 368. The signal CERRO may provide a signal which accurately reflects an off-center condition of the lens 364. The system 100' may track the signal CE_MEASURE with a higher bandwidth. By tracking the signal CE_MEASURE with a higher bandwidth, the system 100' may improve the centering of the lens 364 and provide a faster signal CE recovery after rough seeks. The signal CERRO may provide a reference position for keeping the laser 362 locked to the disc 368 when the system 100' is in the fine seek mode, the rough seek mode or the track follow mode. The signal CERRO may be presented to the the track follow estimator 204, the fine seek estimator 206, and the rough seek CE controller 208.

The system 100' may keep the lens 364 at an optical center while allowing the laser 362 to be locked to the disc 368 in the presence of run out. The signal CERRO may be extracted from the signal CE using a Discrete Fourier Transform (DFT) method as described in connection with FIG. 5. The CERRO generation circuit 102 may remove the once-a-round run out effect from the signal CE to and extract the average position of the lens 364 from the signal CE. The signal CERRO may provide a reference position for the center of the lens 364 while in the presence of run out on the disc. The system 100' may detect a lens off center condition by comparing the signal CE to the signal CERRO. Such a detection may eliminate having to sample the signal CE for at least one revolution to detect the center position of the lens 364.

Figure 9:
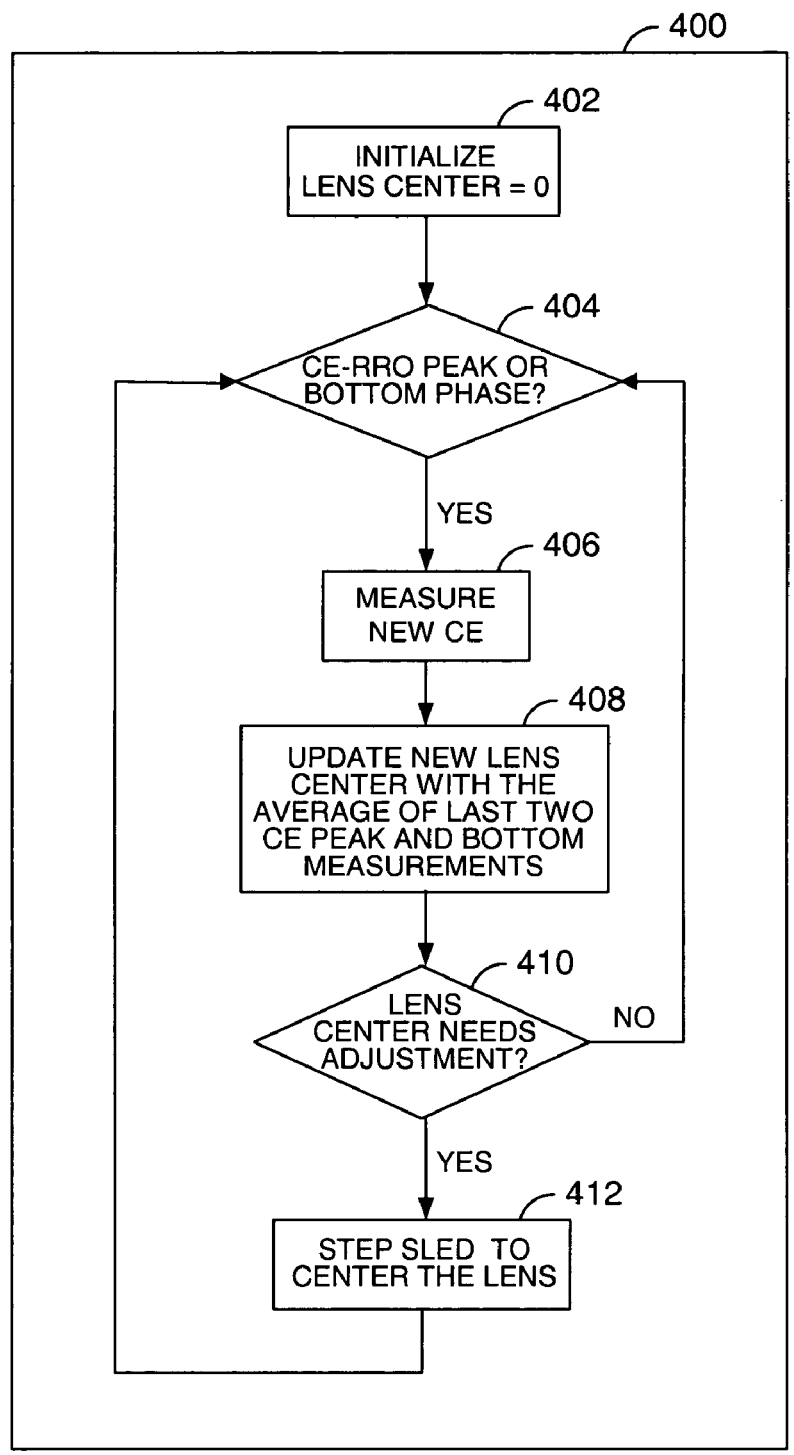
FIG. 9 is a flow diagram illustrating a process for applying a CERRO extraction while in a tracking mode.

Referring to FIG. 9, a flow diagram illustrating a process 400 for applying a CERRO extraction while in a tracking mode is shown. The method 400 generally comprises a state (or step) 402, a decision state (or step) 404, a state (or step) 406, a state (or step) 408, a decision state (or step) 410, and a state (or step) 412. The state 402 may initialize the center of the lens 364 to zero. The decision state 404 may determine whether the signal CERRO is in a peak or a bottom phase. If the signal CERRO is not in a peak or bottom phase, the method 400 stays in the step 404 and no adjustment is made to the lens 364. If the signal CERRO is in a peak or bottom phase, the method 400 moves to step 406. The state 406 may generate the signal CE_MEASURE by comparing the signal CE to the signal CERRO. The step 408 may update the new center of lens 364 with the signal CE_MEASURE by taking the average of the last two peak or bottom measurements of the signal CERRO. The decision state 410 may determine whether the center of the lens 364 needs to be adjusted based on the signal CE_MEASURE. If the center of the lens 364 needs to be adjusted, the method 400 moves to the state 412. The state 412 may move the sled housing 366 with the step motor 359 to center the lens 364. The method 400 moves to the decision state 404 to determine if the signal CERRO is in a peak or bottom phase. If the center of the lens 364 does not need to be adjusted, the method 400 moves to the decision state 404.

The process 400 illustrates that the signal CE_MEASURE may control the position of the lens 364 when the system 100 is in the tracking mode by calculating the center position of the lens 364 from the signal CE at peak phases of the signal CERRO. Since the signal CERRO may provide a reference for the center position of the lens 364 under run out conditions, an off center condition of the lens 364 may be detected by comparing the signal CE with the signal CERRO. Such a comparison may eliminate sampling the signal CE for at least one revolution to detect the center position of the lens 364. As the center position of the lens 364 becomes more reliable, the step motor 359 may act promptly when the lens 364 is off center. The system 100 may speed up the signal CE recovery after rough seeks when the signal CE gets larger due to a track lock process (e.g., locking the laser 362 to the disc 368 to allow the system 100 to enter the track follow mode).

The system 100' may use the signal CERRO to minimize the effect of rotational run out on a disc at all times. The lens 364 may follow the rotational run out of the disc 368 when a tracking loop is closed during tracking and fine seek modes. While the system 100 is in a rough seek mode, the tracking loop may be open. By injecting the signal CERRO to control the lens 364 with the step motor 359 when the system 100 is in the rough seek mode, the relative motion between the lens 364 and the disc 368 due to the rotational run out disc on the 368 may be removed under ideal situations.

Figure 10:
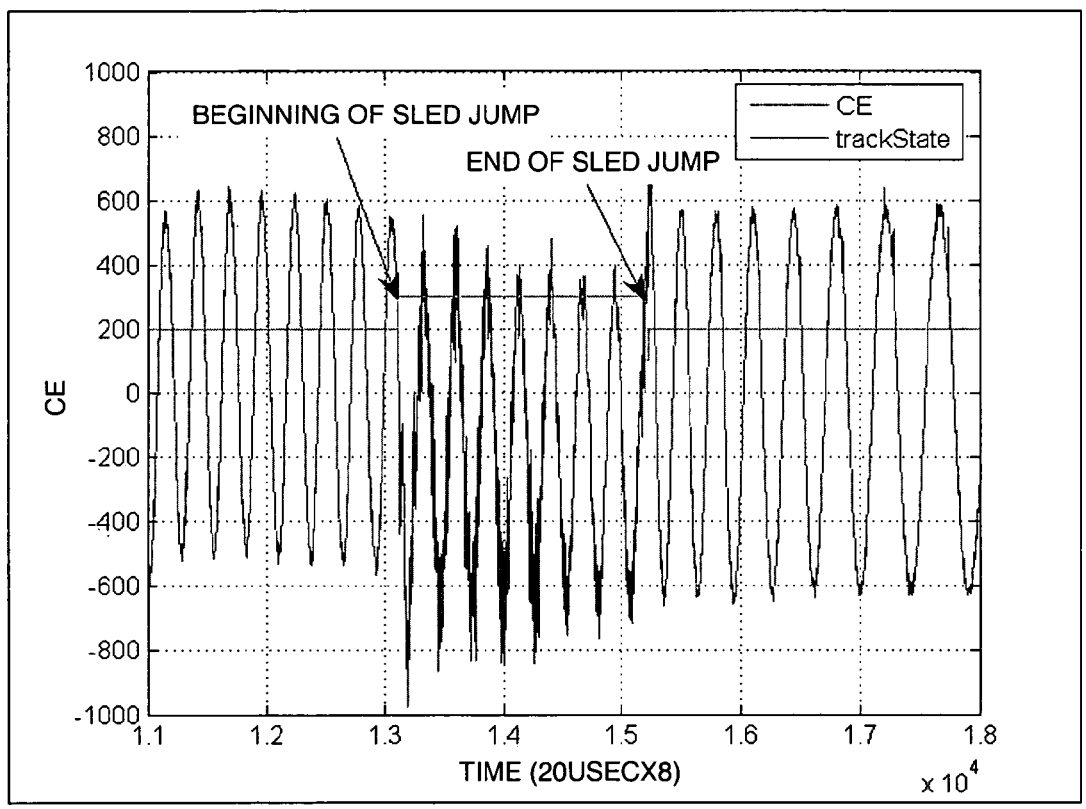
FIG. 10 is a diagram illustrating a CE waveform during a track lock and rough seek with RRO added.

Referring to FIG. 10, a diagram illustrating a CE waveform during a track lock and rough seek with the signal CERRO is shown. With the present invention, the disruption of the motion of the lens 364 before, during and after the rough seek is minimized. The present invention may reduce the relative speed between the lens 364 and the disc 368 due to rotational run out. The present invention may make the track lock after rough seek faster and more reliable, especially on discs with high run-outs.

Figure 11:
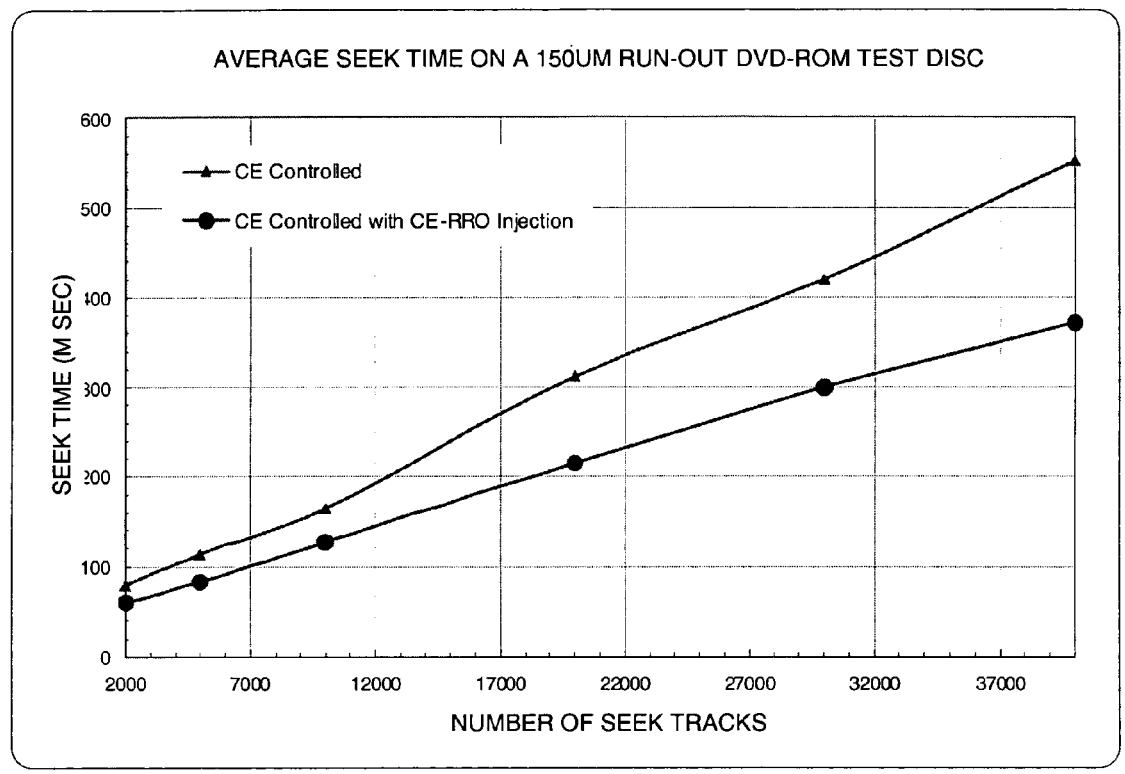
FIG. 11 is a diagram illustrating the difference in rough seek time when applying lens control using the CE waveform with and without the CERRO injection.

Referring to FIG. 11, a diagram illustrating an average seek time between the CE waveform and the CERRO waveform is shown. The system 100 may provide a performance improvement in average rough seek time due to CERRO injection on a 150 µm run-out DVD-ROM disc.

The function performed by the flow diagrams of FIGS. 5 and 9 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing information.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
   a center error creation circuit configured to generate a center error signal in response to a plurality of photo-diode signals;
   a lens controller circuit having a first input receiving said center error signal and a second input receiving a tracking error signal generated in response to said plurality of photo-diode signals, said lens controller circuit configured to adjust a position of a lens in a sled housing in response to said tracking error signal in a first mode and said center error signal in a second mode;
   a center error repeatable run out generation circuit having an input receiving said center error signal, said center error repeatable run out generation circuit configured to generate a center error run out signal and a center error measure signal in response to said center error signal, wherein said center error measure signal is generated by measuring said center error signal when said center error run out signal is in a peak phase; and
   a sled control circuit configured to control a step motor configured to move said sled housing, wherein in said first mode said sled control circuit controls said step motor in response to said center error measure signal and said center error run out signal to move said sled housing to center the lens within the sled housing.

2. The apparatus according to claim 1, wherein said center error repeatable run out generation circuit is further configured to generate said center error measure signal by measuring said center error signal when said center error run out signal is in a bottom phase.

3. The apparatus according to claim 1, wherein said first mode comprises a track follow mode.

4. The apparatus according to claim 1, wherein said center error repeatable run out generation circuit provides a reference for said center position of said lens.

5. The apparatus according to claim 1, further comprising:
   a drive circuit configured to drive said step motor in response to a step size signal, a step direction signal and a step timer control signal received from said sled control circuit.

6. The apparatus according to claim 5, said drive circuit further comprising:
   a a step motor control circuit configured to generate a first drive signal and a second drive signal in response to said step size signal, said step direction signal and said step timer control signal;
   a digital to analog converter circuit configured to control said step motor in response to said first and said second drive signals.

7. The apparatus according to claim 1 wherein said center error run out signal provides a reference for said center position of said lens in one of a rough seek mode, a track follow mode and a fine seek mode.

8. The apparatus according to claim 1, wherein said center error repeatable run out generation circuit detects a lens off center condition by comparing said center error signal to said center error run out signal.

9. A method for controlling a lens in the presence of run out on an optical disc:
   (A) generating a center error signal and a tracking error signal in response to a plurality of photo-diode signals;
   (B) adjusting a position of a lens in a sled housing in response to said tracking error signal in a first mode and said center error signal in a second mode;
   (C) generating a center error run out signal and a center error measure signal in response to said center error signal, wherein said center error measure signal is generated by measuring said center error signal when said center error run out signal is in a peak phase; and
   (D) controlling a step motor configured to move said sled housing, wherein in said first mode a position of said sled housing is adjusted by said step motor in response to said center error measure signal and said center error run out signal to center the lens within the sled housing.

10. The method according to claim 9, further comprising the step of:
    initializing said center position of said lens to zero.

11. The method according to claim 9, further comprising the step of:
    determining whether said center error run out signal is in a peak or a bottom phase.

12. The method according to claim 11, further comprising the step of:
    generating said center error measure signal by measuring said center error signal when said center error run out signal is in a bottom phase.

13. The method according to claim 12, further comprising the step of:
    updating said center position of said lens with said center error measure signal.

14. The method according to claim 13, further comprising the step of:
    using the average of the last two peak and bottom measurements of the center error run out signal.

15. The method according to claim 14, further comprising the step of:
  determining whether said center position of said lens needs adjustment based on said center error measure signal.

16. The method according to claim 15, further comprising the step of:
  performing step (C) if said center error measure signal provides a new center position of said lens.

17. An apparatus comprising:
  means for generating a center error signal and a tracking error signal in response to a plurality of photo-diode signals;
  means for adjusting a position of a lens in a sled housing in response to said tracking error signal in a first mode and said center error signal in a second mode;
  means for generating a center error run out signal and a center error measure signal in response to said center error signal, wherein said center error measure signal is generated by measuring said center error signal when said center error run out signal is in a peak phase; and
  means for controlling a step motor configured to move said sled housing, wherein in said first mode a position of said sled housing is adjusted by said step motor in response to said center error measure signal and said center error run out signal to center the lens within the sled housing.

18. The apparatus according to claim 1, wherein said second mode comprises a rough seek mode.

19. The apparatus according to claim 1, wherein motion of said lens in said sled housing is controlled by a voice coil motor.

20. The apparatus according to claim 19, wherein said lens controller circuit is configured to control said voice coil motor.

* * * * *